United States Patent
Yturriaga-Trenor

(10) Patent No.: US 9,858,730 B2
(45) Date of Patent: Jan. 2, 2018

(54) METHOD FOR DETERMINING THE STATE OF WEAR OF A PART AND FOR INFORMING A CLIENT

(71) Applicant: EURODRIVE SERVICES AND DISTRIBUTION N.V., Drunen (NL)

(72) Inventor: Beltran Yturriaga-Trenor, Clermont-Ferrand (FR)

(73) Assignee: EURODRIVE SERVICES AND DISTRIBUTION N.V., Drunen (NL)

( * ) Notice: Subject to any disclaimer, the term of this patent is extended or adjusted under 35 U.S.C. 154(b) by 0 days.

(21) Appl. No.: 14/433,182

(22) PCT Filed: Oct. 1, 2013

(86) PCT No.: PCT/EP2013/070385
§ 371 (c)(1),
(2) Date: Apr. 2, 2015

(87) PCT Pub. No.: WO2014/053457
PCT Pub. Date: Apr. 10, 2014

(65) Prior Publication Data
US 2015/0262432 A1    Sep. 17, 2015

(30) Foreign Application Priority Data
Oct. 2, 2012 (FR) .................... 12 59320

(51) Int. Cl.
*G07C 5/00* (2006.01)
*B60T 17/22* (2006.01)
(Continued)

(52) U.S. Cl.
CPC ............ *G07C 5/006* (2013.01); *B60C 11/246* (2013.01); *B60T 17/22* (2013.01); *G07C 5/00* (2013.01);
(Continued)

(58) Field of Classification Search
None
See application file for complete search history.

(56) References Cited

U.S. PATENT DOCUMENTS 5,848,672 A * 12/1998 Brearley ................. F16D 65/18
188/1.11 L
6,266,587 B1 * 7/2001 Guertler ................. F01M 11/10
340/438
(Continued)

FOREIGN PATENT DOCUMENTS

EP   0 661 673 A1   7/1995
EP   1 974 961 A2   10/2008
(Continued)

*Primary Examiner* — Thomas G Black
*Assistant Examiner* — Demetra R Smith-Stewart
(74) *Attorney, Agent, or Firm* — Fitzpatrick, Cella, Harper & Scinto

(57) ABSTRACT

In a method of determining a remaining capacity for use of a vehicle part of a motor vehicle, a state of wear of the vehicle part is determined, a remaining distance that can be covered before the vehicle part becomes completely worn is calculated as a function of a type of the vehicle part and the state of wear of the vehicle part, and a remaining service life before the vehicle part must be changed is calculated as a function of an average distance covered by the motor vehicle annually and the remaining distance that can be covered before the vehicle part becomes completely worn.

2 Claims, 1 Drawing Sheet

(51) Int. Cl.
    *B60C 11/24*     (2006.01)
    *G07C 5/08*     (2006.01)
(52) U.S. Cl.
    CPC ........ *B60T 2270/406* (2013.01); *G07C 5/085* (2013.01); *G07C 5/0825* (2013.01)

(56) References Cited

U.S. PATENT DOCUMENTS

| | | | | |
|---|---|---|---|---|
| 6,876,908 B2* | 4/2005 | Cramer | ................. | G06Q 10/06 |
| | | | | 701/29.3 |
| 7,320,246 B2* | 1/2008 | Schick | ................... | B60C 11/24 |
| | | | | 702/188 |
| 8,380,580 B2* | 2/2013 | Kirian | ................... | G06Q 10/06 |
| | | | | 705/26.1 |
| 8,731,767 B2* | 5/2014 | Paturle | ........................ | 701/31.4 |
| 8,849,500 B2* | 9/2014 | Gokyu | ................. | B60C 11/246 |
| | | | | 152/343.1 |
| 2004/0164140 A1* | 8/2004 | Voeller | ................... | G07C 5/008 |
| | | | | 235/375 |
| 2005/0049835 A1* | 3/2005 | Mayer | ..................... | G07C 3/00 |
| | | | | 702/184 |
| 2005/0134443 A1* | 6/2005 | Hottebart | ................. | G01D 7/02 |
| | | | | 340/442 |
| 2007/0250229 A1* | 10/2007 | Wu | ........................ | G06Q 10/06 |
| | | | | 701/31.4 |
| 2008/0228348 A1 | 9/2008 | Lee | ................................ | 701/35 |
| 2009/0118897 A1* | 5/2009 | Schoeggl | ............. | G07C 5/0808 |
| | | | | 701/31.4 |
| 2010/0318246 A1* | 12/2010 | Bieker | ............... | G05B 23/0283 |
| | | | | 701/19 |
| 2011/0221587 A1* | 9/2011 | Katou | ................... | B60C 11/243 |
| | | | | 340/443 |
| 2014/0067599 A1* | 3/2014 | Gokyu | ................. | B60C 11/246 |
| | | | | 705/26.7 |

FOREIGN PATENT DOCUMENTS

| | | | | |
|---|---|---|---|---|
| EP | 2 101 077 A1 | 9/2009 | | |
| FR | 2 814 841 A1 | 4/2002 | | |
| FR | 2 847 976 A1 | 6/2004 | | |
| FR | 2 951 111 A1 | 4/2011 | | |
| SE | WO 2006093452 A1 * | 9/2006 | ......... | G05B 23/0243 |

\* cited by examiner

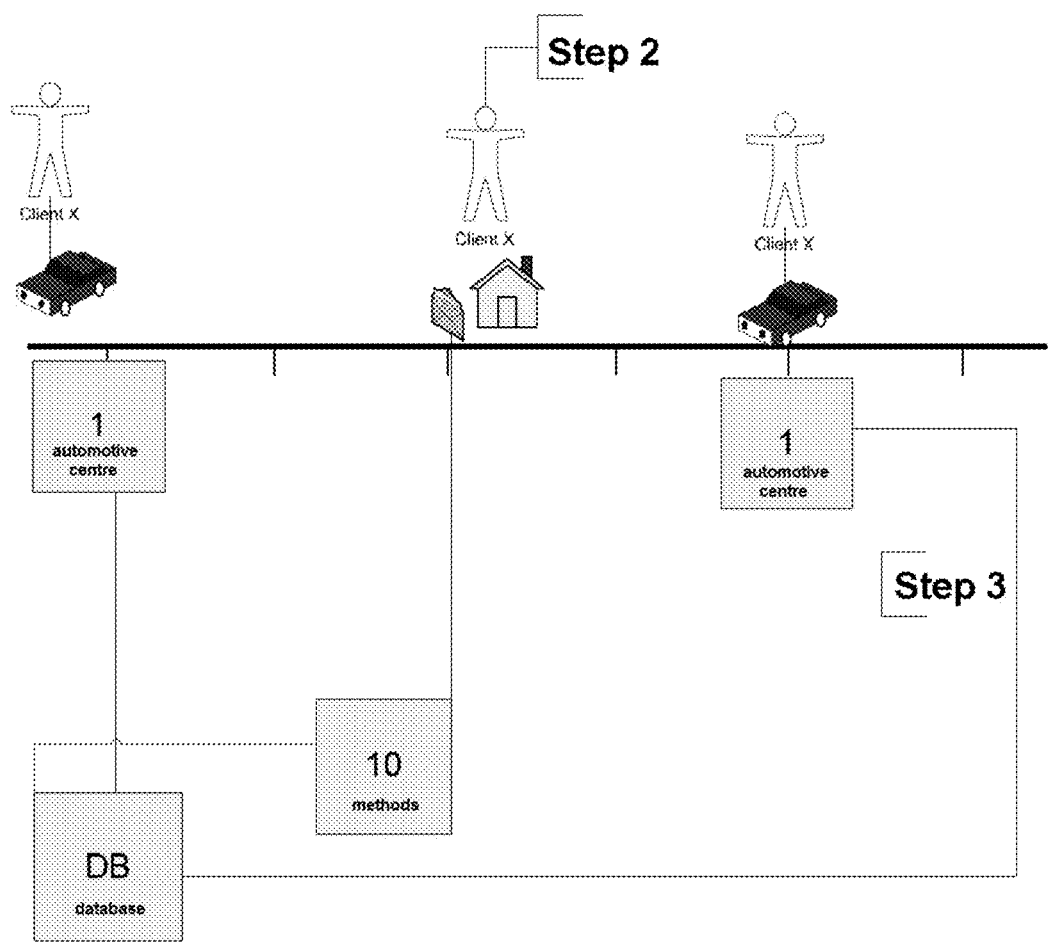

METHOD FOR DETERMINING THE STATE OF WEAR OF A PART AND FOR INFORMING A CLIENT

FIELD OF THE INVENTION

The present invention falls within the field of road vehicle servicing and maintenance, and more particularly the maintenance of vehicle parts that have a limited life. The present invention also relates to vehicle general maintenance, for example oil changes.

More specifically, the present invention seeks to propose a method and a system that make it easier to inform a user of a vehicle in order to allow him to service his vehicle correctly.

BRIEF DESCRIPTION OF THE INVENTION

Thus, the objective of the present invention is to propose a method that makes it possible both to determine the state of wear of various parts of a road vehicle and also to inform the driver of the vehicle when one or more of the parts need changing.

Specifically, because it is difficult for the owner of the vehicle to determine the wear of these parts by visual observations, it is generally a garage mechanic that makes such a check, but the frequency at which a vehicle visits a garage is not high enough to guarantee that part wear is correctly detected.

Now, excessive wear of certain components may have negative consequences in terms of safety, for example in the case of brakes or tyres, and also in terms of comfort, notably in the case of shock absorbers, or alternatively still in terms of fuel consumption.

In order to overcome this disadvantage the use of wear indicators, installed on the tyres, and that allow the user visually to determine whether or not the tyre is worn, is known. However, these are wear indicators which relate only to tyres and checking tyre wear requires an action on the part of a user of the vehicle, who has therefore to remember to check his tyres regularly.

It has therefore seemed necessary to propose means that allow a user to be informed in good time so that he can proceed to change the corresponding parts.

In this field, European patent application EP 2101077, discloses a method that makes it possible to determine the remaining capacity for use of brake linings of a vehicle. This method determines a state of wear of the lining concerned, then determines the remaining amount of wear and from that deduces how much distance the vehicle can still cover.

That application also describes a system for indicating the remaining capacity for use of a brake lining, involving means for transmitting to the driver of the vehicle information regarding the distance that can still be covered.

However, it would appear that this system has several disadvantages. First of all, the system proposed relates only to the brake linings, and therefore does not make it possible to determine and inform a user regarding the wear of other major parts of the vehicle such as the tyres or the shock absorbers. Furthermore, the indication of wear is supplied to the driver of the vehicle while he is driving. Now, this proves to be somewhat impractical for various reasons. On the one hand, it is possible that the person driving the vehicle at the time that the indication appears is not the person in charge of maintaining the vehicle. On the other hand, the driver cannot note the information while driving, and there is a risk that he will have forgotten it once he has returned home.

Also known, from application FR 2847976 is another device indicating wear through the removal of material, making it possible to detect and indicate the wear of parts such as the tyres or the shock absorbers. However, this device has the same disadvantages as those mentioned earlier.

The present invention therefore has a number of objectives including that of determining the remaining capacity for use of a certain number of vehicle parts and that of informing the user of the vehicle in good time of the need to change one or more parts.

Thus, the present invention relates to a method of determining the remaining capacity for use of a motor vehicle part, the method comprising the following steps:
 a step of determining a state of wear of a vehicle part,
 a step of calculating, as a function of the state of wear and of the type of part, a remaining distance that can be covered before the part becomes completely worn,
 a step of calculating, as a function of the remaining distance that can be covered and an average distance covered by the vehicle annually, the remaining service life before the part must be changed.

In an advantageous embodiment, the step of determining a state of wear of a part comprises a step of measuring a physical parameter of the part.

In another advantageous embodiment, the step of measuring a physical parameter comprises a step of measuring a thickness of rubber, when the part is a tyre.

In another advantageous embodiment, the step of determining a state of wear of a part comprises a step of extracting an average replacement frequency for a part of corresponding type from a database.

In another advantageous embodiment, the step of calculating the remaining distance that can be covered takes account of the type of vehicle.

The invention also relates to a method of informing as to the remaining capacity for use of a motor vehicle part, the method comprising the following steps:
 a step of determining the remaining capacity for use of a part using a method according to one of the preceding claims,
 a step of sending a message informing a user of a vehicle of the need to change the corresponding part,
 the method being such that the date on which the message is sent is calculated as a function of the remaining capacity for use as determined during the first step.

In one advantageous embodiment, when the date of sending of the message is earlier than the date on which the determination is made, the message is sent immediately.

A method according to the invention advantageously makes it possible to resolve the disadvantages of the prior art. Specifically, the method of determining the remaining capacity for use may be applied to all the parts of the vehicle and therefore makes it possible to have available a single tool to manage the servicing and maintenance of vehicles in an automotive centre.

Moreover, the sending of a reminder message to a user allows a user to be alerted when he is in the calm of his home, and has time to plan a visit to the automotive centre so that a part can be checked and/or replaced.

Furthermore, this method is entirely transparent to the user, who has nothing further to do than arrange a visit and take his vehicle to the automotive centre.

BRIEF DESCRIPTION OF THE FIGURES

Other objectives and advantages of the invention will become clearly apparent from the description which will follow of a preferred but non limiting embodiment, which is illustrated by the FIGURE which shows a system incorporating one or more methods according to the invention.

DETAILED DESCRIPTION OF THE INVENTION

FIG. 1 shows the chronology of the implementation of various methods in a general vehicle maintenance management system. These methods will describe, by way of example, the tracking of a user, referred to as client X.

General system: in a first step, client X goes to an automotive centre 1, for a routine service and/or to have a vehicle part changed. During this visit, various items of data are captured and recorded in a database of the maintenance system.

These data comprise:
- personal data, supplied by the client, such as his name, his postal and/or electronic address, his telephone number;
- data regarding the vehicle, such as the type of vehicle, the registration number, the odometer reading on the day of the visit and also the mean distance covered by the vehicle annually.

Moreover, other types of data are recorded in the database: these are data corresponding to technical checkpoints that are measured and/or checked by a technician at the automotive centre. These checkpoints relate, for example, to the thickness of rubber remaining on the tyres, the oil level, etc.

The database DB in which the data are recorded is housed either by the automotive centre or by an independent management centre. Hereinafter, we shall employ the term management centre even in instances in which the management centre and the automotive centre are the same.

The management centre thus, on the basis of the data recorded, implements various methods 10 according to the invention and detailed hereinafter, that lead to the sending to client X, during a step 2, a reminder message informing him of the need to check and/or replace one or more vehicle parts.

If the client so wishes, in a step 3, he returns to the automotive centre in order to have the relevant replacement carried out. On this occasion, the data recorded in the database are updated in order to determine correctly the state of wear of the parts that have not been replaced and remind client X in good time. The methods therefore follow from one another alternatively throughout the life of the vehicle.

Method of determining the remaining capacity for use of a part: a number of ways of determining this state of wear will be described hereinafter non limitingly.

It must be emphasized here that the scope of the invention is not restricted to the specific parts mentioned hereinafter. Moreover, throughout the application, the term "check and/or replace parts" is to be considered in the broadest sense, and may comprise replacing parts such as the tyres, the brakes, the shock absorbers, but may also involve changing the vehicle oil, topping up the brake fluid, or even checking the wheel alignment.

When the part concerned is a tyre, the state of wear is determined by measuring the thickness of rubber remaining on the tread patterns. From this thickness, and according to the type of vehicle, it is possible to determine the amount of distance that can be covered in complete safety. What is meant by type of vehicle is the usual classifications of "city car", "sedan", "people carrier". To that end, a look-up table as shown hereinbelow is employed:

TYRE: NUMBER OF KILOMETERS REMAINING AS A FUNCTION OF REMAINING TREAD DEPTH IN MILLIMETERS

| | City car | Sedan | People carrier Large sedan |
|---|---|---|---|
| Front(mm) | | | |
| 8 | 38500 | 35000 | 31500 |
| 7.5 | 35292 | 32083 | 28875 |
| 7 | 32083 | 29167 | 26250 |
| 6.5 | 28875 | 26250 | 23625 |
| 6 | 25667 | 23333 | 21000 |
| 5.5 | 22458 | 20417 | 18375 |
| 5 | 19250 | 17500 | 15750 |
| 4.5 | 16042 | 14583 | 13125 |
| 4 | 12833 | 11667 | 10500 |
| 3.5 | 9625 | 8750 | 7875 |
| 3 | 6417 | 5833 | 5250 |
| 2.5 | 3208 | 2917 | 2625 |
| 2 | 0 | 0 | 0 |
| Rear(mm) | | | |
| 8 | 44000 | 40000 | 36000 |
| 7.5 | 40333 | 36667 | 33000 |
| 7 | 36667 | 33333 | 30000 |
| 6.5 | 33000 | 30000 | 27000 |
| 6 | 29333 | 26667 | 24000 |
| 5.5 | 25667 | 23333 | 21000 |
| 5 | 22000 | 20000 | 18000 |
| 4.5 | 18333 | 16667 | 15000 |
| 4 | 14667 | 13333 | 12000 |
| 3.5 | 11000 | 10000 | 9000 |
| 3 | 7333 | 6667 | 6000 |
| 2.5 | 3667 | 3333 | 3000 |
| 2 | 0 | 0 | 0 |

If the part concerned is a brake pad, a brake disc or a shock absorber, the state of wear is determined by comparing the amount of distance covered since the part was installed with an average frequency at which a part is checked and/or replaced. These average frequencies are given by the manufacturers of the parts and recorded in a database used by a method according to the invention.

For example, it is considered that a brake pad needs to be checked and/or replaced every 40000 kilometers. For a brake disc or for a shock absorber, inspection and/or replacement is to be carried out every 80000 kilometers. This information is, for example, supplied by the manufacturer of the various parts and/or determined through experience.

The amount of distance that has been covered since the part was installed and therefore the amount of distance that can still be covered, is, for example, determined by consulting the database in which various items of information regarding the life of a vehicle are recorded.

In one particular case, it is possible that the determination of the amount of distance covered yields a result that is higher than the average replacement frequency. In such a situation, which creates an exception error in the management system, the method of informing the user is not implemented.

Method of informing the user: from the amount of distance that can still be covered as determined by one of the methods described hereinabove, a method according to the invention comprises the step of sending the user of the vehicle a message informing him of the need to check and/or replace the part concerned.

There are a number of parameters that are needed in order to allow this message to be issued and sent. First of all it is necessary to determine the date on which the message is to be sent. This is because the message needs to reach the user early enough for him to have time to get the part replaced before it is completely worn, but, in order to avoid early replacement, which would increase vehicle servicing costs, not too early.

In an advantageous embodiment, the date for sending the message is determined from two parameters: the amount of distance that can still be covered before a part becomes worn, and the average distance covered by the vehicle each year. Thus, the message is sent, for example, in the first week of the X month following the calculation month, where X=[(remaining number of kilometers)/(number of kilometers per year)*12]−1.

The average number of kilometers covered on average per year is, for example, declared by the user of the vehicle when he registers for the service that proposes to send out these messages. In another example, the average number of kilometers is determined by a technician of a maintenance centre from regular observations of the odometer reading. In both instances, the average number of kilometers is recorded in a database so that it can be used when needed.

In one particular instance, the calculation described hereinabove may yield a date earlier than the date of the calculation. In concrete terms, that means the message should have been sent out earlier. In such instances, the message is sent out immediately.

Moreover, it is possible that the state of a vehicle requires several parts to be replaced and prioritizing is beneficial in order not to send several types of message to the same user at the same time. This prioritizing is performed differently according to whether these are preventive reminders, i.e. messages that do not need to be sent out until several months later, or immediate reminders, i.e. messages that need to be sent out immediately.

In the case of preventive reminders, the parts are prioritized in the following order: tyres, brakes, brake fluid, fluid change, shock absorbers. In the case of immediate reminders, the order of priority of the parts is as follows: tyres, brakes, wheel alignment, oil change, shock absorbers.

Let us consider the example of a vehicle that visited the automotive centre on 1 Jun. 2009. The driver declares that he covers 15000 kilometers per year, the vehicle odometer reading is 50000 kilometers and the last oil change was performed at the 45000 kilometer mark. The determination of the amount of distance that can still be covered and of the date on which to send out the messages yields the following results:

| Pads | 20000 km can still be covered | (20000/15000) × 12 = 16 months |
|---|---|---|
| Discs | 50000 km can still be covered | (50000/15000) × 12 = 40 months |
| Shock absorbers | Odometer reading (in kilometers) | (80000 − 50000)/15000 × 12 = 24 months |
| Oil change | Odometer reading (in kilometers) | (15000 − (50000 − 45000))/15000 × 12 = 8 months |

As far as the front and rear tyres of the vehicle are concerned, implementing a method according to the invention yields the following results, based on the look-up table disclosed previously:
  Type of vehicle: Sedan
  Front tyres: 5 mm remaining (minimum of the two, R & L, tyres)
  Rear tyres: 4 mm remaining (minimum of the two, R & L, tyres)
  Number of kilometers remaining on front tyres, according to table: 17500
  Number of kilometers remaining on rear tyres according to table: 13333
  Deadline for sending out the reminder for the front tyres: (17500/15000)×12=14 months
  Deadline for sending out the reminder for the rear tyres: (13333/15000)×12=10.6 months It will be noted that the deadline for sending out the reminder for the rear tyres is not expressed as a whole number of months. This deadline is rounded down to the whole number immediately below in order to simplify the management of the sending-out of the messages. This is because a method according to the invention is advantageously implemented in a management centre tasked with sending out messages for all of the users of an automotive centre, or even a set of automotive centres. It is therefore beneficial to plan for all of the messages that are to be sent out during a month to be sent out during a common period. This is because that makes it possible to optimize the cost of processing the messages at the management centre.

However, in instances in which the method determines that an immediate reminder needs to be sent out, the message is sent at whatever time of the month it might be. This is because immediate reminders relate to parts which have not been changed in good time, and which may therefore exhibit a degree of wear that is dangerous to the behaviour of the vehicle.

In order to send out the message, a parallel is drawn between the vehicle analyzed and its owner, so that a postal and/or electronic address to which the message is sent can be extracted from the database.

The methods described hereinabove are, for example, implemented via a computer tool. They may be incorporated into a more general management system used by an automotive centre.

In that context, the method may be used for commercial purposes, notably to maintain customer loyalty of and/or provide reminders to the clients of an automotive centre.

Thus, in one particular embodiment, when the database indicates that a client has not visited the automotive centre for a certain predetermined period of time, for example a year, the method of sending out messages allows a special message to be sent out incorporated in the stream of delayed reminders.

Database management: As mentioned previously, methods according to the invention use data recorded in one or more databases. These data may be classified into various categories: "client" data, "vehicle" data, "invoice" data, "reminder" data.

In order to allow good use of the database, it is beneficial, in a preferred embodiment, for the information captured to be normalized before it is recorded in one of the databases.

Furthermore, each vehicle registered in a database is assigned to a client and vice versa. However, it is necessary to manage instances in which a vehicle changes ownership. Thus, if the vehicle of a client is incorporated when the vehicle already exists, assigned to another client, the previous client will be unassigned from the vehicle if ownership has changed. The vehicle is deactivated in the database and not deleted.

Of course, the invention is not restricted to the examples described and depicted and various modifications can be made thereto without departing from the scope thereof as defined by the attached claims.

The invention claimed is:

1. A method of informing as to a remaining capacity for use of a vehicle part of a motor vehicle, the method comprising:

determining a remaining capacity for use of the vehicle part by:
  determining a state of wear of the vehicle part,
  calculating, as a function of a type of the vehicle part and the state of wear of the vehicle part, a remaining distance that can be covered before the vehicle part becomes completely worn, and
  calculating, as a function of an average distance covered by the motor vehicle annually and the remaining distance that can be covered before the vehicle part becomes completely worn, a remaining service life before the vehicle part must be changed; and
sending a message to inform a user of the motor vehicle of a need to change the vehicle part,
wherein a date on which the message is to be sent is calculated as a function of the determined remaining capacity for use of the vehicle part.

2. The method according to claim 1, wherein, when the date on which the message is to be sent is earlier than a date on which the remaining capacity for use of the vehicle part is determined, the message is sent immediately.

\* \* \* \* \*